UNITED STATES PATENT OFFICE 2,379,961

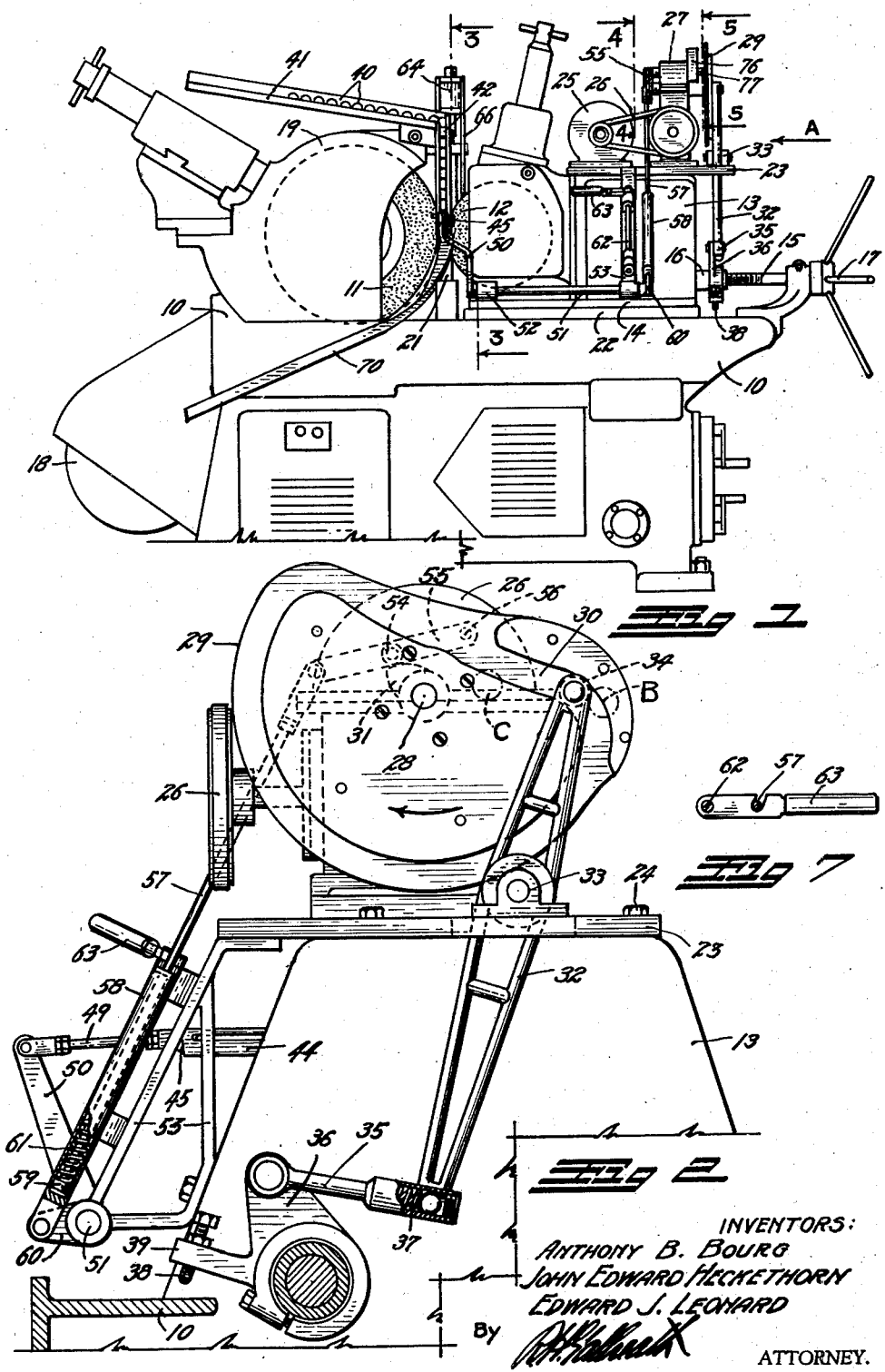

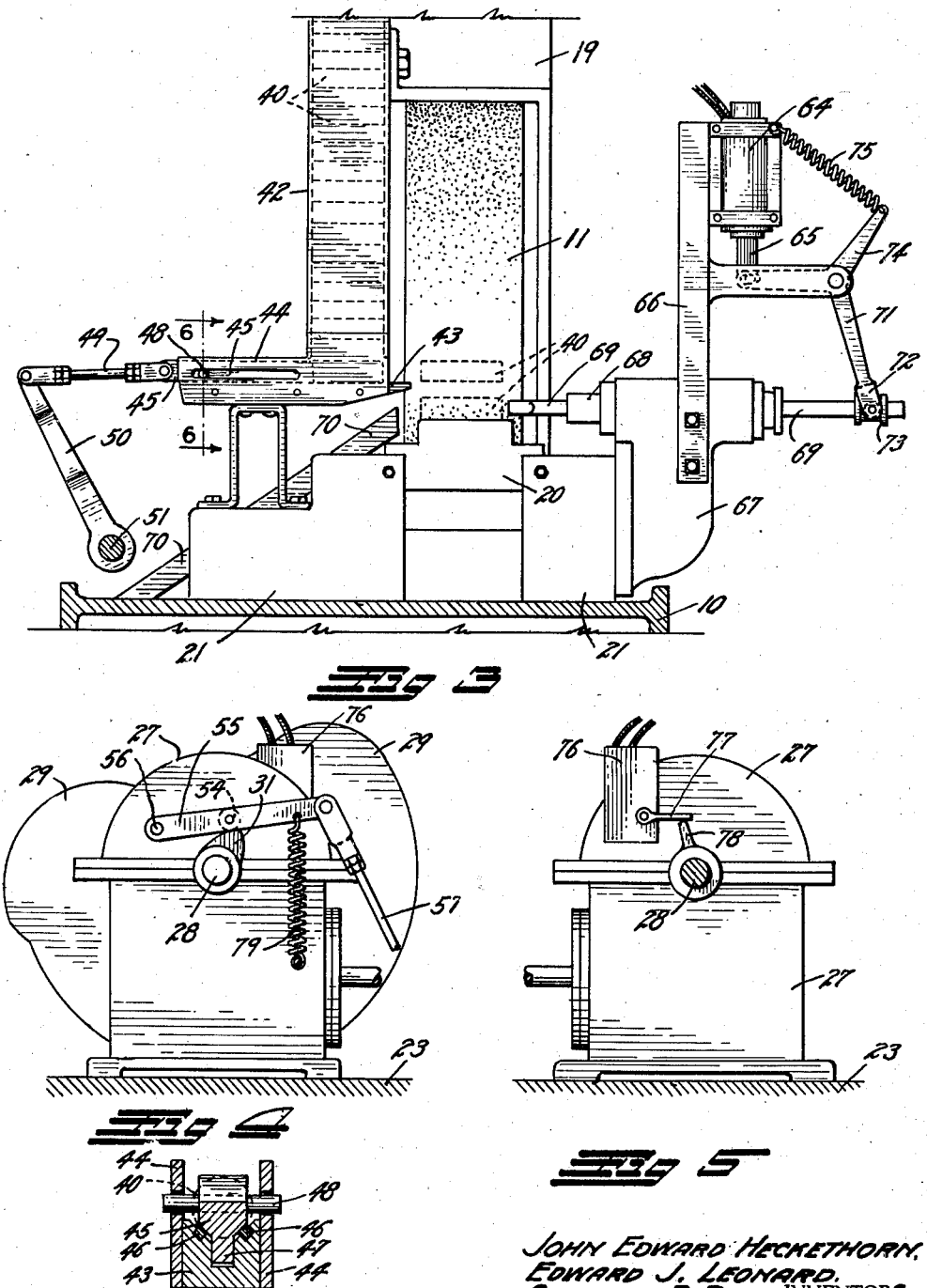

AUTOMATIC INFEED AND EJECTING ATTACHMENT FOR GRINDING MACHINES

John E. Heckethorn, Anthony B. Bourg, and Edward J. Leonard, Littleton, Colo., assignors to Heckethorn Manufacturing & Supply Co., Littleton, Colo.

Application August 2, 1943, Serial No. 497,102

9 Claims. (Cl. 51—215)

This invention relates to an automatic feeding and ejecting device for grinding machines of the "centerless" type. The principal object of the invention is to provide a simple and highly efficient device which can be quickly and easily applied to the present centerless grinding machines so as to eliminate all hand operations thereon, and which will positively accurately and continuously feed the work to the machine, subject it to the proper precision grinding; and eject it upon completion of the grinding.

Another object of the invention is to so construct the device that it will be practically "foolproof," so that should the infeed become clogged for any reason, the feeding mechanism will cease to function without damage to the mechanism, and to provide a device which can be accurately regulated to remove only the required amount of material during the grinding operation.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side view of a typical centerless grinding machine illustrating the elements of the invention in place thereon;

Fig. 2 is an enlarged end view of a feeding mechanism looking in the direction of the arrow A, Fig. 1;

Fig. 3 is an enlarged vertical section through the throat of the grinding machine, taken on the line 3—3, Fig. 1;

Fig. 4 is an enlarged detail section, taken on the line 4—4, Fig. 1;

Fig. 5 is a similar section taken on the line 5—5, Fig. 1;

Fig. 6 is a still further enlarged cross section through the feed slide, taken on the line 6—6, Fig. 3; and Fig. 7 is a detail view of the feed control handle employed in the device.

Standard parts of a typical centerless grinding machine are designated on the drawings by the numeral as follows: bed 10, grinding wheel 11, feed wheel 12, feed wheel motor housing 13, feed wheel carriage 14, feed wheel carriage feed screw 15, feed wheel feed sleeve 16, hand wheel 17, grinding wheel motor 18, grinding wheel housing 19, work rest 20, work rest holder 21, lower slide 22, ejection plunger bracket 67 and ejection plunger 69.

The feed screw 15 is threaded through a feed sleeve 16. The feed sleeve is mounted in the carriage 14, between suitable thrust bearings. Thus rotation of the feed screw 15 in the sleeve moves the carriage 14 and rotation of the sleeve 16 on the feed screw also moves the carriage.

In such a machine the work being ground rests upon the work rest 20 between the grinding wheel 11 and the feed wheel 12. The feed screw 15 is rotated by means of the hand wheel 17, to bring the feed wheel carriage 14 adjacent the work. The feed sleeve 16 is then rotated on the feed screw to move the carriage 14 forwardly for a pre-set distance sufficient to bring the work to the required finish diameter. Therefore the amount of rotation of the feed sleeve 16 determines the amount of grinding which will be done and the sleeve must be reciprocated the pre-set distance for each article to be ground. The wear of the grinding wheel is adjusted during operation by rotation of the hand wheel 17.

This invention is designed to automatically place the work between the wheels 11 and 12; then rotate the feed sleeve 16 at the proper speed and for the proper distance to remove the required material from the work; then withdraw the feed wheel 12 by return reciprocation of the feed sleeve 16; and thence eject the finish piece of work from between the wheels 11 and 12. With the exception of the grinding wheel 11, only the parts added to the standard machine are shown shaded in the drawings. The unshaded parts will be found in all standard machines.

The improved device employes a base plate 23 which is mounted on and attached to the motor housing 13 in any desired manner, such as by means of cap screws 24. The base plate carries an operating motor 25, which, through the medium of a V-belt 26 and a speed reducer 27, rotates a cam shaft 28. The speed reducer may be any of the standard commercial varieties, and will be herein designated in its entirety by the numeral 27. The shaft 28 projects from both sides of the speed reducer 26 and on the front side terminates in a relatively large cam member 29, provided with a face cam track 30. At its other extremity the shaft 28 terminates in a lifting cam 31.

A rocker arm 32 is journalled in suitable bearings 33 on the plate 23, and projects through a suitable opening in the latter so as to extend both above and below the plate. The upper extremity of the rocker arm terminates in a cam follower roller 34 which rides in and follows the contour of the cam track 30. The lower extremity of the rocker arm 32 terminates in a connecting rod 35 which connects it with a crank member 36 clamped on the feed sleeve 16. The attachment between the rocker arm 32 and the connecting rod 35 is cushioned by means of a cushion spring 37 so that the rocker arm may have a greater arc of movement than the crank 36. The arc of movement of the latter is regulated by means of a limit screw 38 projecting from an arm 39 formed on the crank 36. This limit screw contacts any fixed part of the grinding machine such as the bed 10 at the extremity of each forward movement of the crank 36.

It can be readily seen that if the cam 29 rotates in the direction of the arrow in Fig. 2, the contour of the cam track will cause the upper extremity of the arm 32 to swing to the extreme right position, as indicated by the broken line circle B. It will be held in this position for approximately one-half a revolution, and will then be swung to the left, to the position indicated at C, for approximately one-half a revolution. The movement to the position B causes the lower extremity of the rocker arm to swing the lever 36 so as to actuate the feed sleeve to move the feed wheel 12 against the work. After the grinding has been completed, the movement of the rocker arm to the position C will withdraw the feed wheel from the work to allow it to be removed and replaced. The amount of advance of the feed wheel is regulated by the regulating screw 38 which limits the movement of the crank 36 yet allows the arm 32 to continue its movement against the action of the cushioning spring 37.

The articles to be ground, indicated on the drawings by the numeral 40, are fed to the machine by means of an inclined feed chute 41 which feeds the articles into a substantially vertical feed hopper 42. A bottom slide 43 closes the bottom of the feed hopper 42 and projects inwardly, to a position in the throat of the grinding machine, and outwardly to form a bottom in a plunger box 44 containing a feed plunger 45. A longitudinal, V-shaped groove is formed in the top of the slide 43 to receive and guide the articles. This groove is lined with hardened wear strips 46 against which the articles rest. A guide channel is formed in the bottom of the groove in which a tongue 47 on the plunger 45 travels. The plunger 45 is held in place on the slide by means of suitable spline 48 which travel in slots in the sides of the box 44.

The plunger 45 is actuated by means of a connecting rod 49 which connects it with the extremity of an actuating lever 50. The lever 50 is mounted upon an infeed shaft 51, which is journalled on the feed wheel carriage 14 in any desired manner. As illustrated one extremity of the shaft is carried in a suitable journal box 52 and the other extremity thereof is supported in a bearing carried by a bracket member 53 secured to the side of the motor housing 13 and to the base plate 23.

The shaft 51 is reciprocally rotated by the action of the lifting cam 31. The latter rides against a bearing roller 54 mounted in a lifting lever 55 which is hinged at 56 on the speed reducer 27. A tension spring 79 holds the lever against the cam 31. The free extremity of the lever 55 terminates in a pull rod 57 which extends within a spring tube 58 terminating in a head 59 therein. The lower extremity of the spring tube 58 is hingedly connected to the extremity of a crank 60 mounted on the shaft 51. A compression spring 61 is carried in the spring tube 58 between the head 59 and the closed upper extremity of the tube so that tension on the rod 57 will tend to compress the spring 61.

It can be seen that each time the cam 31 rotates it will lift the lever 55 causing the shaft 51 to be partially rotated through the medium of the rod 57, spring 61, spring tube 58, and crank 60. This partial rotation will swing the actuating lever 50 inwardly causing it to push the plunger 45 against the work. This movement of the plunger pushes the bottom article 40 from the stack in the hopper and deposits this article between the grinding wheel 11 and the feed wheel 12, allowing it to drop to the work rest 20. The spring 79 then returns the plunger to its former position ready to infeed the next following article. The cam 29 will now close the feed wheel against the article to initiate the grinding operation, upon completion of which, the wheels will be separated and the article ejected.

It is desired to call attention to the fact that should anything interfere with the infeed of the article, the plunger 45 will not move forwardly. The only result will be that the action of the lifting cam 31 will simply compress the spring 61 in the tube 58 without placing injurious pressure on the plunger. This cushioning feature is also made use of to start and stop the feeding operation without interfering with the operation of the motor 25. This is accomplished by mounting a handle shaft 62 on the bracket 53 alongside of the spring tube 61. The upper extremity of the handle shaft carries a control handle 63 which can be swung to the right or left. When swung to the right, it will engage the pull rod 57 above the spring tube 58, so that the latter can not move upwardly with the movement of the rod. This is to effectively stop the motion of the infeed plunger without stopping the motor 25, the reciprocating motion being absorbed at this time by the spring 61. As soon as it is desired to start feeding again, the handle 63 is swung to the left out of the path of the tube 58.

The ejection of the finished article is accomplished electrically, that is, a solenoid 64 of any commercial variety, having a retractable armature 65, is employed. The solenoid is supported by means of a solenoid frame 66, which is mounted on the plunger bracket 67 which in turn is mounted on the work rest holder 21. The plunger bracket 67 supports a slide tube 68 for the ejection plunger 69. The inner extremity of the ejection plunger is positioned to extend transversely of the throat of the machine immediately above the work holder 20. Therefore, when it is actuated inwardly, it will push the finished article from the work holder into a receiving chute 70.

The actuation of the plunger is accomplished by means of a bell-crank lever 71, one arm of which is operatively connected to the armature 65. The other arm of the bell-crank lever terminates in a yoke 72 which rides in a yoke spool 73 on the plunger 69. A spring arm 74 projects from the lever 71 to receive a tension spring 75. It can be readily seen that each time the solenoid 64 is energized it will force the plunger 69 forwardly to eject the finished piece from the work holder 20 and that when de-energized, the spring 75 will return the parts to their original position. The energizing of the solenoid at the proper time is accomplished by means of a suitable contact closing device of any desired type. As illustrated, an enclosed tilt switch 76 is employed. Such a switch has a tilting lever 77 projecting therefrom. Each time this lever is lifted, the switch will close contact. In this machine the lifting of the lever 77 is accomplished by means of a finger 78 projecting from the cam shaft 28 at the proper point to lift the lever when the feed wheel 12 is retracted, and before the plunger 45 is actuated. The switch 76 is in an electrical circuit with the solenoid 64 to control the cycles of operation of the latter.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a centerless grinding machine having a feed wheel, means for moving the feed wheel toward and away from the work comprising: a feed member adapted to reciprocate the feed wheel in consequence of its rotation; a crank member secured to said feed member; a rocking lever; a pivot for said rocking lever intermediate its extremities; a connecting rod connecting one extremity of said rocking lever with said crank member; a cam for swinging the other extremity of said rocking lever; and means for rotating said cam.

2. In a centerless grinding machine having a feed wheel, means for moving the feed wheel toward and away from the work comprising: a feed member adapted to reciprocate the feed wheel in consequence of its rotation; a crank member secured to said feed member; a rocking lever; a pivot for said rocking lever intermediate its extremities; a connecting rod connecting one extremity of said rocking lever with said crank member; a motor driven cam shaft; a cam on said shaft acting against the other extremity of said lever to rock the latter, said cam being contoured to maintain said lever for a longer period of time at one extremity of its arc than at the other extremity thereof.

3. Means for feeding work pieces between the wheels of a centerless grinding machine and for bringing said wheels into and out of the grinding position comprising: a motor operated shaft; a first cam on said shaft; a cam follower cooperating the said first cam to advance and withdraw one of said wheels; a second cam on said shaft; a second cam follower cooperating with said second cam; a feeding mechanism operable in consequence of the movement of said second follower and stop means for preventing movement of said feeding mechanism when desired.

4. Means for feeding work pieces between the wheels of the centerless grinding machine and for bringing said wheels into and out of the grinding position comprising: a motor operated shaft; a first cam on said shaft; a cam follower cooperating with the said first cam to advance and withdraw one of said wheels; a second cam on said shaft; a second cam follower cooperating with said second cam; a feeding mechanism operable in consequence of the movement of said second follower stop means for presenting movement of said feeding mechanism when desired; a third cam on said shaft; and means operable in consequence of the rotation of said third cam for forcing the finished work piece from between said wheels.

5. Means for feeding work pieces between the wheels of a centerless grinding machine and for bringing said wheels into and out of the grinding position comprising: a motor operated shaft; a first cam on said shaft; a cam follower cooperating the said first cam to advance and withdraw one of said wheels; a second cam on said shaft; a second cam follower cooperating with said second cam; a vertical work piece magazine positioned adjacent the throat between said wheels; a sliding feed member positioned to force the lowermost work piece from said holder to a position between said wheels; means for reciprocating said feed member in consequence of the movement of said second follower; spring means interposed between said second follower and said feed member so that the follower may move without imparting movement to said feed member; and means for preventing movement of the feed member when desired.

6. In a grinding machine of the type having two grinding wheels and a work rest for supporting pieces to be ground between the wheels, means for successively inserting the pieces between the wheels and removing them therefrom comprising: wheel separating means for separating the wheels at the completion of each grinding cycle; a work piece magazine positioned to one side of the space between the wheels; a floor in said magazine positioned above the work rest; in-feeding means for forcing the lower-most piece from said magazine to a position between the wheels above the work rest so that it may fall by gravity to the latter, said in-feeding means being operable in consequence of the separation of said wheels; and ejecting means positioned on the opposite side of the space between the wheels to return the piece from said work rest to the first side of said space before the next succeeding piece falls to said work rest.

7. In a grinding machine of the type having two grinding wheels and a work rest for supporting pieces to be ground between the wheels, means for successively inserting the pieces between the wheels and removing them therefrom comprising: a cam-shaft; a motor for rotating said cam shaft; first cam on said cam shaft; a rocking lever pivoted intermediate its extremities, one of said extremities being in contact with said first cam; connecting means between the other extremity of said lever and one of said wheels for separating the wheels at the completion of each grinding cycle; a magazine positioned at one side of the space between said wheels; a floor in said magazine positioned above the work rest; an in-feed member for forcing the lowermost work piece from said floor to a position between said wheels above said work rest; a second cam on said cam shaft; and means operable from said cam for reciprocating said infeed member.

8. In a grinding machine of the type having two grinding wheels and a work rest for supporting pieces to be ground between the wheels, means for successively inserting the pieces to be ground between the wheels and removing them therefrom comprising; a cam-shaft; a motor for rotating said cam shaft; first cam on said cam shaft; a rocking lever pivoted intermediate its extremities; one of said extremities being in contact with said first cam; connecting means between the other extremity of said lever and one of said wheels for separating the wheels at the completion of each grinding cycle; a magazine positioned at one side of the space between said wheels; a floor in said magazine positioned above the work rest; an infeed member for forcing the lowermost work piece from said floor to a position between said wheels above said work rest; a second cam on said cam shaft; means operable from said second cam for reciprocating said infeed member an injection plunger for forcing the finished piece from said work rest; a solenoid for operating said plunger; and means on said cam shaft for closing a circuit to said solenoid at a time when the wheels are separated.

9. In a grinding machine of the type having two grinding wheels and a work rest for supporting pieces to be ground between the wheels, means for successively inserting the pieces to be ground between the wheels and removing them therefrom comprising; a cam-shaft; a motor for rotating said cam shaft; first cam on said cam shaft; a rocking lever pivoted intermediate its extremities; one of said extremities being in contact with said first cam; connecting means between the other extremity of said lever and one of said wheels for separating the wheels at the completion of each grinding cycle; a magazine positioned at one side of the space between said wheels; a floor in said magazine positioned above the work rest; an in-feed member for forcing the lowermost work piece from said floor to a position between said wheels above said work rest; a second cam on said cam shaft; and means operable from said second cam for reciprocating said infeed member an injection plunger for forcing the finished piece from said work rest; a solenoid for operating said plunger; and means on said cam shaft for closing a circuit to said solenoid at a time when the wheels are separated; and work receiving means positioned on the same side of the space between the wheels as said magazine and at a lower elevation than said work rest to receive the ejected piece.

JOHN E. HECKETHORN.
ANTHONY B. BOURG.
EDWARD J. LEONARD.